May 24, 1932.     O. S. CAESAR     1,859,429
AUTOMOBILE HEATER
Filed Oct. 23, 1929
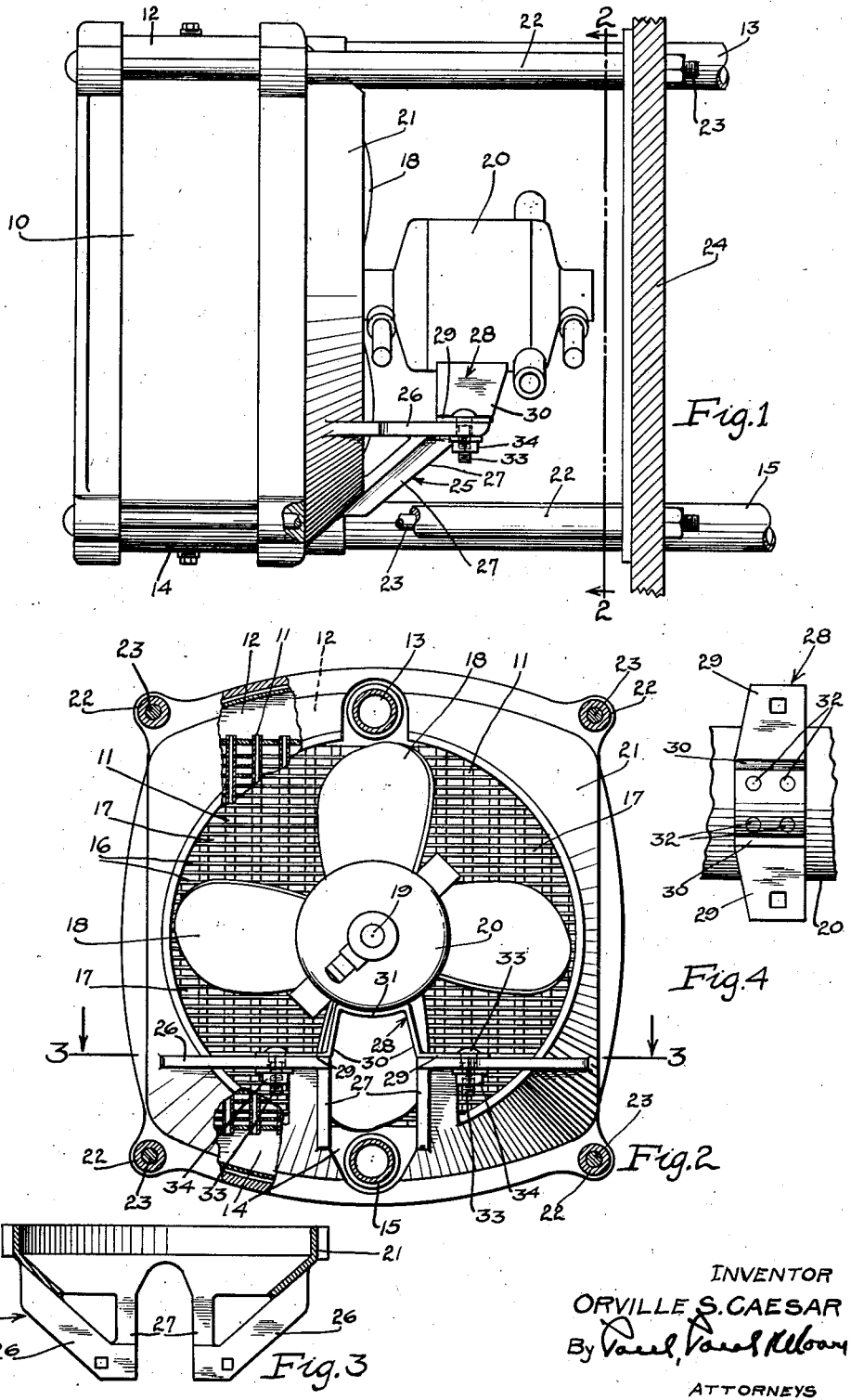
INVENTOR
ORVILLE S. CAESAR
ATTORNEYS Patented May 24, 1932

1,859,429

UNITED STATES PATENT OFFICE

ORVILLE S. CAESAR, OF CHICAGO, ILLINOIS, ASSIGNOR TO TROPIC-AIRE, INCORPORATED, OF MINNEAPOLIS, MINNESOTA, A CORPORATION OF DELAWARE

AUTOMOBILE HEATER

Application filed October 23, 1929. Serial No. 401,719.

This invention relates to an automobile heater, and an object of the invention is to provide an automobile heater wherein will be incorporated certain improvements over the disclosure of my Reissue Patent No. 17,131, granted November 13, 1928.

The heating unit of my reissue patent identified, consists of a heating member casing having a heating medium container arranged to have water from the circulating system of an internal combustion engine to pass therethrough, said container being provided with air passages, and a motor supported in operative relation to the heating member for a fan situated adjacent the air passages, to circulate air through said passages. A specific object of the present invention is to provide an automobile heater of this general character including improved means for mounting a motor thereon.

Other objects of the invention will appear as the description thereof proceeds.

In the accompanying drawings forming a part of this specification,

Fig. 1 is a side elevational view of an automobile heater having the features of the invention;

Fig. 2 is a sectional view on line 2—2 in Fig. 1;

Fig. 3 is a sectional view on line 3—3 in Fig. 2;

Fig. 4 is a detail view of a part of the motor mounting, showing a fragment of the motor.

With more particular reference to Figs. 1 to 4 of the drawings, 10 represents the casing of a heating member including water-circulating tubes 11 each opening at one end to a chamber 12 in which a fluid conducting member 13 is arranged, and each opening at its opposite end to a chamber 14 in which a fluid conducting member 15 is arranged, the manner in which the water-circulating tubes 11 are associated with the chambers 12 and 14 being more clearly disclosed in Fig. 2.

Numeral 16 represents spaced apart plates extending transversely of the water-circulating tubes 11 and having perforations through which said water-circulating tubes pass. Side portions of the casing 10 are adjacent to or contiguous with the ends of the spaced apart plates 16 to provide air-circulating passages 17 between the plates and about the tubes or containers 11 and within the confines of the four walls of the casing 10.

The heating member as briefly described is more particularly adapted to be inserted within the body of an automotive vehicle. It can be supported in said body in any suitable manner. The fluid conducting member 13 may be a water-inlet connected with the water-circulating cooling system of the engine of an automotive vehicle, and the fluid conducting member 15 may be a water outlet, also connected with said water-circulating cooling system, in such manner that hot water can be caused to pass through the chamber 12, the water-circulating tubes or containers 11, and the chamber 14, to cause air made to travel through the air-circulating passages 17 to be heated. The passage of the water through the heating member as described could of course be reversed. When the heating member is mounted adjacent the dash of an automotive vehicle the water inlet 13 and the water outlet 15 may pass through the dash.

The heating member as disclosed includes a fan 18 adjacent an end of the air-circulating passages 17 adapted to the purpose of causing air to be forcibly circulated through said air-circulating passages to absorb heat from the water in the water-circulating tubes 11, to thus be heated and to in turn heat the interior of a vehicle body.

The fan 18 is supported upon the shaft 19 of a motor 20 itself supported upon the heating member in the novel manner now to be set forth.

A shroud 21 attached to or held against the heating member casing 10 in any suitable manner, as by sleeves 22 upon tie-bolts 23 which, as shown, support the heating member upon a board, such as a dash-board 24, includes an integral support 25 extending in direction away from the heating member. It will be seen that the tie-bolts pass through flanged frames upon the heating member casing, one of said flanged frames including the shroud 21, and that the sleeves 22 are situated between the dash-board 24 and the adjacent flanged member to space this flanged member away from the dash-board and to hold it against the heating member casing.

The integral support 25 consists of spaced apart horizontal arms 26 upon the shroud 21 which are strengthened by obliquely disposed integral braces 27 which extend from the shroud upwardly and outwardly and connect with the horizontal arms 26 at their inner ends.

Numeral 28 designates a shaped bracket including legs 29 adapted to rest upon the horizontal arms 26, upwardly and slightly inwardly disposed lengths of material 30 integral with said legs 29, and a curvilinear length of material 31 extending between said lengths of material 30 for directly supporting the motor 20. As disclosed, the curvilinear length of material 31 is shaped to be nicely fitted to the motor 20, in such manner that the motor can rest directly upon said curvilinear length of material. As more clearly shown in Fig. 4, the curvilinear length of material 31 is directly attached to the motor casing, as by spot welding indicated 32.

The legs 29 of the bracket 28 and the horizontal arms 26 of the integral support 25 are provided with perforations adapted to aline with each other when the bracket legs are positioned upon said horizontal arms with the bracket disposed in upstanding position. Numeral 33 represents screw bolts passing through the legs and horizontal arms, and 34 indicates nuts, one on each screw bolt, for rigidly fastening the legs 29 and the horizontal arms 26 to each other.

I claim as my invention:

1. The combination with a heating member, and a motor having a fan for causing air to be brought into contact with said heating member, of spaced apart arms carried by said heating member, a bracket having a portion of its length fitted against and welded to a lower portion of said motor and extremities adapted to rest upon said spaced apart arms, and means for securing said extremities to said arms.

2. In a heater provided with a casing, a motor, a mounting for the motor including spaced apart arms carried by a portion of the heater casing, a bracket having a portion fitted against and secured to the lower portion of the motor and having feet adapted to rest upon said spaced apart arms, and means for securing said feet to said arms.

3. In a heater provided with a casing, a motor, a mounting for the motor comprising rearwardly and inwardly extending arms integrally formed with a portion of the heater casing, said arms being situated below the axis of the heater, a bracket secured to the motor and having depending legs provided with portions adapted to engage said arms, and means for securing said leg portions to said arms.

In witness whereof I have hereunto set my hand this 15th day of October, 1929.

ORVILLE S. CAESAR.